(12) United States Patent
Otting

(10) Patent No.: US 12,508,786 B2
(45) Date of Patent: Dec. 30, 2025

(54) AUTO SKIVE FILLING SYSTEM

(71) Applicant: BRIDGESTONE BANDAG, LLC, Nashville, TN (US)

(72) Inventor: Robert G. Otting, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 18/835,441

(22) PCT Filed: Jan. 25, 2023

(86) PCT No.: PCT/US2023/061215
§ 371 (c)(1),
(2) Date: Aug. 2, 2024

(87) PCT Pub. No.: WO2023/150445
PCT Pub. Date: Aug. 10, 2023

(65) Prior Publication Data
US 2025/0115013 A1   Apr. 10, 2025

Related U.S. Application Data

(60) Provisional application No. 63/306,181, filed on Feb. 3, 2022.

(51) Int. Cl.
*B29C 73/02* (2006.01)
*B29L 30/00* (2006.01)

(52) U.S. Cl.
CPC ......... *B29C 73/025* (2013.01); *B29L 2030/00* (2013.01)

(58) Field of Classification Search
CPC .......................... B29L 2030/00; B29C 73/025
See application file for complete search history.

(56) References Cited

U.S. PATENT DOCUMENTS

| | | | |
|---|---|---|---|
| 2,157,151 A | 5/1939 | Stackhouse |
| 2,243,461 A | 5/1941 | Haskins |
| 3,082,506 A | 3/1963 | Jensen |
| 3,384,146 A | 5/1968 | Sommer |

(Continued)

FOREIGN PATENT DOCUMENTS

| CN | 107415293 A | * 12/2017 | ............ B05B 1/267 |
|---|---|---|---|
| CN | 107443467 A | 12/2017 | |

(Continued)

OTHER PUBLICATIONS

Machine translation JPH11129343A (Year: 1999).*

(Continued)

*Primary Examiner* — Jacob T Minskey
*Assistant Examiner* — Wayne K. Swier

(57) ABSTRACT

A method for automatically filling skived areas on a tire carcass is provided. The method including analyzing, by a computer system, a surface of a tire carcass with a sensor, identifying, by the computer system, a first skived area of the tire carcass, determining, by the computer system, whether to perform a filling operation to fill the first skived area, communicating, by the computer system, the location of the first skived area to a filling device responsive to a determination to perform the filling operation, and filling, by the filling device, the first skived area.

15 Claims, 11 Drawing Sheets

(56) References Cited

U.S. PATENT DOCUMENTS

| | | |
|---|---|---|
| 3,747,177 A | 7/1973 | Jensen |
| 3,820,580 A | 6/1974 | Meserve et al. |
| 3,868,795 A | 3/1975 | Rees |
| 3,993,115 A | 11/1976 | Greene et al. |
| 4,072,072 A | 2/1978 | Harb |
| 4,144,923 A | 3/1979 | Curry |
| 4,609,026 A | 9/1986 | Kondoh |
| 5,247,981 A | 9/1993 | Benedicto et al. |
| 5,458,727 A | 10/1995 | Meyer |
| 7,501,033 B2 | 3/2009 | Hrycyk et al. |
| 8,025,750 B2 | 9/2011 | Tanaka |
| 8,499,625 B2 | 8/2013 | Cappuccini |
| 8,538,579 B2 | 9/2013 | Cottone et al. |
| 8,597,449 B2 | 12/2013 | Incavo et al. |
| 8,603,274 B2 | 12/2013 | Lelio |
| 8,833,425 B2 | 9/2014 | Cappuccini |
| 9,044,909 B2 | 6/2015 | Lelio et al. |
| 9,434,214 B2 | 9/2016 | Iwamura |
| 10,006,836 B2 | 6/2018 | Monti et al. |
| 10,780,662 B2 | 9/2020 | Coel et al. |
| 11,104,090 B2 | 8/2021 | Little et al. |
| 2015/0047453 A1 | 2/2015 | Moller |
| 2018/0037072 A1 | 2/2018 | Yoshikawa et al. |
| 2019/0184760 A1 | 6/2019 | Cerny et al. |
| 2019/0283354 A1 | 9/2019 | Lelio |
| 2022/0161512 A1 | 5/2022 | Iwamoto et al. |
| 2024/0051770 A1 | 2/2024 | Dettorre et al. |

FOREIGN PATENT DOCUMENTS

| | | | |
|---|---|---|---|
| CN | 109732965 A | 5/2019 | |
| CN | 111216279 A | 6/2020 | |
| CN | 211761550 U | 10/2020 | |
| CN | 115257038 A | 11/2022 | |
| EP | 0 119 839 A2 | 9/1984 | |
| EP | 1 428 624 A2 | 6/2004 | |
| EP | 2 173 541 A1 | 4/2010 | |
| EP | 3 565 715 A1 | 11/2019 | |
| EP | 3 663 078 A1 | 6/2020 | |
| FR | 2190600 A1 | 6/1976 | |
| JP | 11-129343 A | 5/1999 | |
| JP | 2000-079599 A | 3/2000 | |
| JP | 2004-249297 A | 9/2004 | |
| JP | 2006-312272 A | 11/2006 | |
| JP | 2008-128790 A | 6/2008 | |
| JP | 2009-078365 A | 4/2009 | |
| JP | 2012-533458 A | 12/2012 | |
| JP | 5962282 B2 | 8/2016 | |
| JP | 2018-181723 A | 11/2018 | |
| KR | 1020100002785 A | 6/2008 | |
| KR | 101962387 B1 | 3/2019 | |
| WO | WO-2011010211 A1 * | 1/2011 | ............ B29D 30/54 |
| WO | WO-2023/094928 A1 | 6/2023 | |

OTHER PUBLICATIONS

Machine translation CN107415293A (Year: 2017).*
Machine translation JP2018181723A (Year: 2018).*
Office Action for JP Application No. 2024-544950, dated Dec. 17, 2024.
"Quality Control for New Tire Production and Retreading Industry", https://www.zeiss.com/us, pp. 1-6.
https://www.patbase.com, dated Mar. 24, 2021, pp. 1-11.
Zeiss, "Quality Control for New Tire Production and Retreading Industry", pp. 1-6, available at https://web.archive.org/web/20211026045312/zeiss.com/metrology/products/systems/zeiss-intact.html (archived Oct. 2021).
Tire Retreading Sidewall Grinding Device, Mar. 2021, Chinese-language document with English translation, pp. 1-11.
International Search Report and Written Opinion for PCT Application No. PCT/US2022/080961, dated May 1, 2023.
International Search Report and Written Opinion for PCT Application No. PCT/US2023/061215, dated May 15, 2023.
National Highway Traffic Safety Administration, Washington, DC, US Department of Transportation, Jan. 1988, pp. 1-6.
Tire Demon—Tire Scythe, excerpt from https://www.youtube.com/watch?v=t5_RPf3wNK4 (Mar. 25, 2020).
Skilled Euroimpianti, "Skilled Robots for Tires," pp. 1-2, Mar. 12, 2024.
Office Action for JP Application No. 2024-544950, dated May 7, 2025.

* cited by examiner

AUTO SKIVE FILLING SYSTEM

CROSS-REFERENCE TO RELATED PATENT APPLICATIONS

This application is the U.S. National Phase entry of PCT Application No. PCT/US2023/061215, filed Jan. 25, 2023, which claims priority to and the benefit of U.S. Provisional Patent Application No. 63/306,181, filed Feb. 3, 2022, the entire contents of each of which is incorporated herein by reference.

FIELD

The present disclosure relates to tire processing, including retreading of tires.

BACKGROUND

Retreaded tires provide an economical way to gain additional use from tire casings after the original tread or retread has become worn. For example, according to one method of retreading, sometimes referred to as cold process retreading, worn tire tread on a used tire is removed. The removal creates a buffed, treadless surface about the circumference of the tire casing to which a new layer of tread may be bonded. Other methods such as mold cure retreading and hot cap retreading may also be used. Repairing tires without retreading is another method to gain additional use from tires.

The tire carcass is then typically inspected for injuries, some of which may be skived and filled with a repair gum while others may be severe enough to warrant rejection of the casing. Next, a layer of cushion gum may be applied to the back, i.e., the inside surface of a new layer of tread, or alternatively, the layer of cushion gum may be applied directly to the tacky surface on the tire carcass. The cushion gum is a layer of uncured rubber material. The cushion gum and tread may be applied in combination about the circumference of the tire carcass to create a retreaded tire assembly for curing. As an alternative, a length of tire tread may be wrapped around the tire casing with the cushion gum already applied. The cushion gum may form the bond between the tread and the tire casing during curing.

SUMMARY

New tread for precured retreading applications is typically molded as a single piece with the tread pattern on one side. Such treads are sometimes referred to as a precured tread. The precured tread typically has a width corresponding to the width of the crown of the casing and is cut to the length corresponding to the casing circumference. Alternatively, continuous replacement tread is applied, a roller pressing process, commonly referred to as stitching, is next performed on the assembly to force air from between the tread strip and casing.

Following assembling of the tire carcass, cement, cushion gum, and tread, the overall retreaded tire assembly may be placed within a flexible rubber envelope. An airtight seal may be created between the envelope and the bead of the tire. The entire envelope tire assembly may be placed within a curing chamber and subjected to a vulcanization process that binds the materials together.

As the steps for retreading are both time consuming and labor intensive, introducing new technologies to decrease the time needed to complete the steps without affecting the quality of the retread. In addition to decreasing the time needed per step, many steps are performed manually. Hence, process improvements to automate and standardize the steps are desirable.

At least one embodiment relates to a method for automatically filling skived areas on a tire carcass. The method including analyzing, by a computer system, a surface of a tire carcass with a sensor, identifying, by the computer system, a first skived area of the tire carcass, determining, by the computer system, whether to perform a filling operation to fill the first skived area, communicating, by the computer system, the location of the first skived area to a filling device responsive to a determination to perform the filling operation, and filling, by the filling device, the first skived area.

Another embodiment relates to a system for automatically filling skived areas on a tire carcass, the system including a scanner, a filling device, and a controller communicatively coupled to the scanner and the filling device, the controller comprising a processor and a memory configured to store instructions to cause the controller to perform operations. The operations including analyze, using the scanner, the surface of the tire carcass, identify a first skived area of the tire carcass, determine whether to perform filling of the first skived area, and provide an instruction to the filling device to fill the first skived area.

Another embodiment relates to non-transitory computer readable medium configured to store computer-executable instructions therein that, when executed by a processor, cause the processor to performs operations. The operations including analyzing, by the processor, tire carcass surface data received from a scanner, identifying, by the processor, a first skived area from the tire carcass surface data, determining, by the processor, whether to perform filling to fill the first skived area, and commanding, by the processor, a filling device to fill the first skived area, responsive to making a determination to perform the filling.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
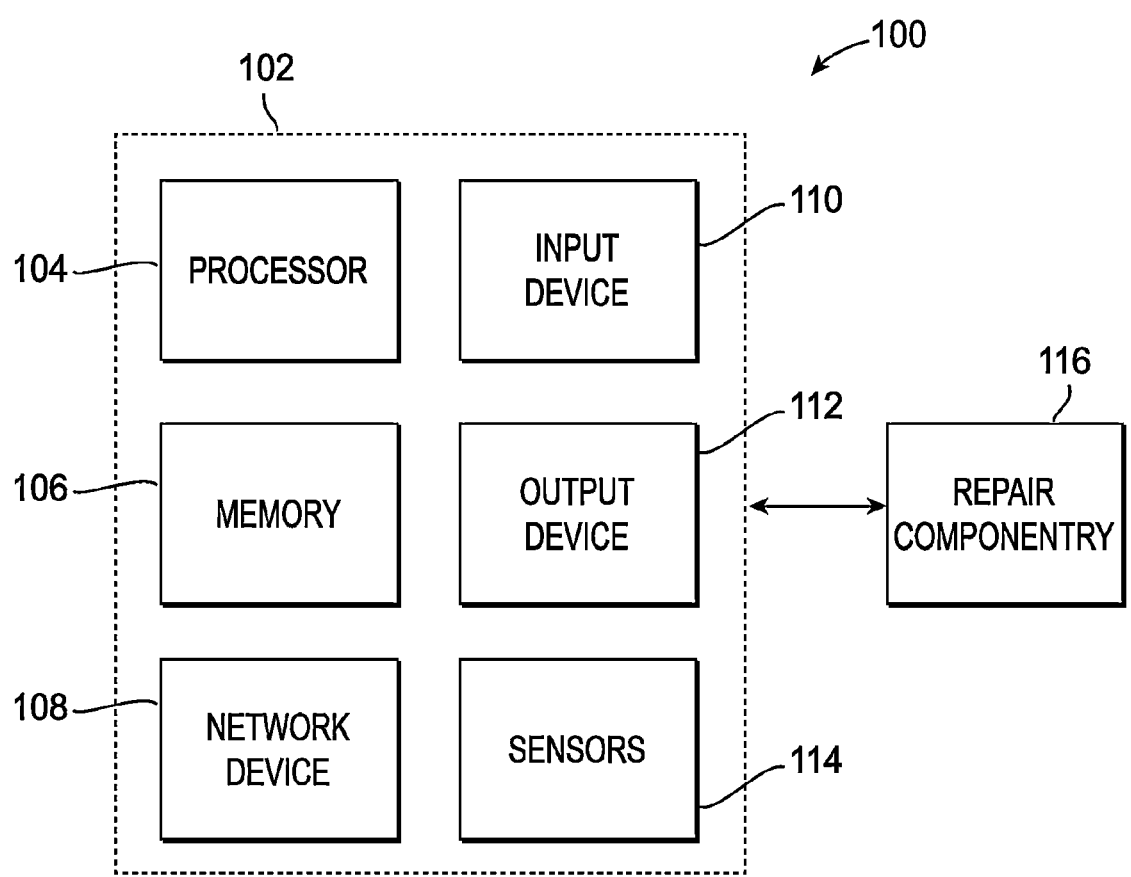
FIG. 1 is block diagram of a tire repair system, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "cured", "curing", "cure" and the like refer to a material undergoing a chemical reaction to develop a cross-link matrix in the rubber matrix. Curing may be accomplished chemically or through the application of heat or other energy source. For example, vulcanization is a type of curing that involves the use of agents such as sulfur (among other types of agents).

As utilized herein, the term "precured" refers to a material that is already cured. Conversely, "uncured" refers to materials that are in their raw form and have not been cured. For example, curing an uncured material results in a cured or precured material.

As used herein, the term "precured tire tread" refers to a tire tread or build-up (e.g., precured product having no tread pattern thereon; blank; slick) that is separate from (e.g., not cured to) a tire carcass. After a precured tire tread has been cured to a tire carcass, the precured tire tread becomes a tire tread, and the combination of the precured tread cured to the tire carcass forms a tire. The precured tire tread may take the form of a strip, oval, circle, ring, or similar shape.

As used herein, the term "carcass" or "tire carcass" refers to the framework of a tire. The carcass includes all the layers (e.g., rubber, reinforcing cord, etc.) that absorbs the internal air pressure, weight, and shock associated with the operation of a tire.

As used herein, the term "anomaly" or "artifact" in reference to a tire carcass refers to an area on the tire carcass that may be repaired during the retreading process.

As used herein, the term "skive" or "skiving," refers to the process of removing portions of a tire carcass. Skiving prepares anomalies on a tire carcass for repair. Skiving is completed by a rotary tool with a bit configured for removing tire carcass materials (e.g., rubber, steel cord, etc.).

As described herein, the terms "axial" and "axially" refer to the direction parallel to an axis.

As described herein, the terms "radial" and "radially" refer to the direction toward or away from a central axis.

As described herein, the terms "circumferential" or "circumferentially" refer to an arc along a round shape (e.g., along the circumference).

When retreading a tire, a tire carcass is first repaired. A tire may also be repaired without retreading. During the repair process, at least a portion of the tread of the tire is removed from the tire carcass. After the portion is removed, the tire carcass is inspected for features (e.g., damage, scrapes, anomalies, etc.) that are later skived and filled with new rubber. When done manually, skiving and filling can be time consuming as each anomaly is skived and filled one at a time through a manual process. A method and system for more efficient filling of skived areas of a tire carcass is desirable during the manufacturing process and additionally reducing human input in the process.

Referring now to FIG. 1, a block diagram of a tire repair system 100 is shown, according to an example embodiment. The tire repair system 100 may be used to complete a tire retreading process or a portion of a tire retreading process, such as repairing anomalies in a tire carcass. In some embodiments, the tire repair system 100 may be used to repair tires independently of a tire retreading process. The tire repair system 100 may be used for repairing a variety of tires (e.g., summer tires, winter tires, heavy-duty tires, etc.) made from a variety of materials (e.g., synthetic rubber, natural rubber, fabric, wire, carbon black, etc.). In some embodiments, the tire repair system 100 is included (e.g., integrated) in a manufacturing plant or an assembly line.

The tire repair system 100 includes a computer system 102 (e.g., a controller). The computer system 102 controls the operation of the tire repair system 100. The components of the computer system 102 are operably coupled to one another (e.g., interconnected, wired connection, wireless connection, etc.) such the components of the computer system 102 may send and receive signals to and from the other components of the computer system 102. The computer system 102 includes a processor 104, a memory 106, a network device 108, an input device 110, an output device 112, and a plurality of sensors 114. In some embodiments, the processor 104 includes one or more microprocessors, application specific integrated circuits (ASICs), field programmable gate array (FPGAs), other forms of processing circuits, or combinations thereof. The memory 106 stores data. For example, the memory 106 may include electrical, optical, magnetic, or any other storage or transmission device capable of providing the processor 104 with program instructions. The memory 106 may include storage devices, such as a magnetic disk, memory chip, ROM, RAM, EEPROM, EPROM, flash memory, optical media, or any other suitable memory from which the processor 104 can ready instructions and/or data. In some embodiments, the memory 106 includes an application (e.g., computer program designed to carry out specific task), through which the computer system 102 can be managed.

The computer system 102 further includes the network device 108. The network device 108 facilitates communication between the computer system 102 and an outside source (e.g., computer, server, mobile device, etc.). The network device 108 may include a communication interface that is configured to send and receive signals and data through a wired connection (e.g., local area network, etc.) or wirelessly (e.g., Wi-Fi, Bluetooth, etc.). The network device 108 allows for the computer system 102 to send and receive signals or data from an outside source. For example, the operation of the network device 108 may include storing data on an external device (e.g., server, mobile device, etc.) or may include receiving instructions from an external device. In some embodiments, the computer system 102 is only connected to an associated device and may operate with or without network connectivity.

The computer system 102 further includes the input device 110. The input device (an input interface or user interface) 110 is configured to allow a user to input instructions into the computer system 102 and may allow a user to modify the operation of the tire repair system 100. The input device 110 is a device configured for entering commands into the computer system 102, such as a keyboard, mouse, touchscreen, stylus, control panel, and similar input devices. In some embodiments, the input device 110 includes voice control. The computer system 102 also includes the output device 112, the output device 112 being a device configured for displaying or communicating information, such as a monitor, audio system, light array, and similar output devices. In some embodiments, the input device 110 and the output device 112 are the same device. For example, the input device 110 and the output device 112 may be a computer or computer tablet having integrated functionality to carry out both input and output operations.

The computer system 102 further includes or is provided with the plurality of sensors 114. For example, the computer system 102 may be configured to communicate with a sensor array including the plurality of sensors 114. The sensors 114 monitor the operation of the tire repair system 100. The sensors 114 may be optical sensors, temperature sensors, sound level meters, and the like. In some embodiments, the computer system 102 is configured to alter the operation of the tire repair system 100 when one of the sensors 114 detects a non-compliant (e.g., out of compliance) condition, such as not meeting a predetermined standard. For example, if the temperature of a component reaches a predetermined level indicating potential overheating, the computer system 102 may scale back the operation of the tire repair system 100 to allow the component to cool down. An iterative process may be performed wherein the tire repair sensor receives input from a temperature sensor at predetermined intervals, and, if the temperature is exceeded, the operation of the tire repair system 100 is altered to allow a predetermined cool down period, after which information from the temperature sensor is then evaluated to determine whether the operation may be returned to a prior condition.

The tire repair system 100 further includes repair componentry 116. The repair componentry 116 is operably coupled to the computer system 102 and configured to receive operating commands from the computer system 102. The computer system 102 controls and monitors the function of the repair componentry 116. The repair componentry 116 may be configured as hardware utilized for repairing at least a portion of one or more tires. In particular, the repair componentry 116 includes devices configured for repairing a tire, and more specifically for repairing a tire carcass. For example, the repair componentry 116 may include a skiving device (a skiver) and a filling device (a filler). As discussed below, the repair componentry 116 may include further componentry.

Figure 2:
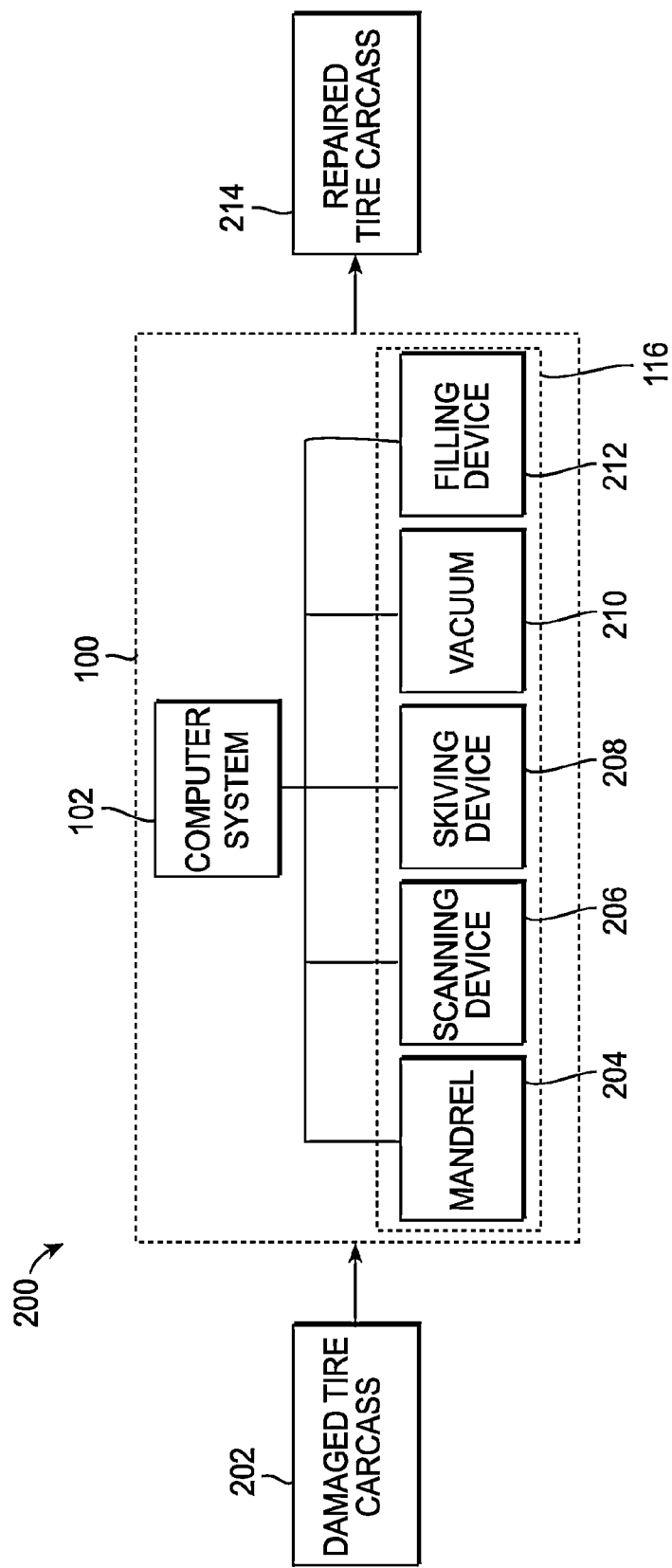
FIG. 2 is a process diagram of a carcass repair system, according to an example embodiment.

Referring now to FIG. 2, a process diagram of a carcass repair system 200 is shown. The carcass repair system 200 is configured to analyze and repair a tire carcass. The carcass repair system 200 includes a damaged tire carcass 202. The damaged tire carcass 202 may be a used (e.g., having operated on a vehicle) tire without a tread. The damaged tire carcass 202 may be visibly damaged (e.g., chunked, scarred, worn, punctured, etc.) or may have anomalies or artifacts that cannot be detected without a non-destructive detector (e.g., high-voltage x-ray technology, other detection technology, etc.). In some embodiments, the damaged tire carcass 202 may have minor anomalies or damage (e.g., generally not requiring repair, or not requiring extensive repair), but is passed through a tire repair system 100 out of precaution or as part of a predetermined process. In some embodiments, the carcass repair system 200 is completed without input from a user. In some embodiments, the carcass repair system 200 is completed in a tire repair process area that is physically separated from other tire manufacturing processes.

The tire repair system 100 of FIG. 2 includes the computer system 102 and the repair componentry 116. As mentioned with reference to FIG. 1, the computer system 102 includes components for controlling the operation of the tire repair system 100. In some embodiments, in addition to a skiving device and filling device, exemplary repair componentry may include additional componentry. For example, the repair componentry 116 includes a mandrel 204, a scanner 206, a skiving device 208, a vacuum 210, and a filling device 212.

The repair componentry 116 includes the mandrel (e.g., rotatable hub, expandable hub, etc.) 204 onto which the damaged tire carcass 202 may be loaded. In some embodiments, the damaged tire carcass 202 may be a damaged tire with tread still attached. The mandrel 204 is configured to receive the tire carcass 202 and selectively couple to the tire carcass 202 such that the damaged tire carcass 202 rotates with the mandrel 204. In some embodiments, the mandrel 204 does not rotate, but is coupled to the damaged tire carcass 202 such that the damaged tire carcass 202 does not rotate when receiving circumferential loads. In some embodiments, the computer system 102 send rotational signals to a motor operably coupled to the mandrel 204 and configured to rotate the mandrel 204. After the tire carcass 202 is loaded onto the mandrel 204, a scanner 206 scans the outer surface of the damaged tire carcass 202. The scanner 206 is configured to measure variations (e.g., artifacts, roughness, etc.) in the surface of the tire carcass 202 and send data corresponding to the measured variations to the computer system 102. The scanner 206 may be an optical scanner employing image processing or lasers, or a similar device that can determine one or more surface characteristics of the damaged tire carcass 202. The computer system 102 receives the data from the scanner 206 and determines whether the damaged tire carcass 202 should be repaired. In some embodiments, the computer system 102 follows a set of predetermined rules and/or parameters to determine whether to repair the damaged tire carcass 202. In some embodiments, the computer system 102 includes an algorithm (e.g., machine learning, artificial intelligence, etc.) that determines whether the damaged tire carcass 202 should be repaired based on the results from a training set. The data from the scanner 206 also includes location data that allows for the computer system 102 to map where the damaged tire carcass 202 should be repaired.

In some embodiments, the computer system 102 mapping where the damaged tire carcass 202 should be repaired includes developing a 3-D coordinate model of the damaged tire carcass 202. The 3-D coordinate model may include an overlay (e.g., coordinate layer, highlighted coordinates, coordinates assigned a particular value, etc.) corresponding to the determined areas of the damaged tire carcass 202 that should be repaired. In some embodiments, the computer system 102 creates a coordinate model of the areas of the tire carcass 202 that should be repaired (e.g., only the portions of the carcass 202 that appear to warrant repair are modeled, without modeling other areas of the carcass 202).

Once a determination is made of whether the damaged tire carcass 202 should be repaired and the location(s) of area(s) requiring repair are mapped, the skiving device 208 is used to skive the areas of the damaged tire carcass 202 that should be repaired. The skiving device 208 includes a bit (e.g., drill bit, grinding bit, etc.) operably coupled to a rotary tool configured to remove portions of the damaged tire carcass 202. In some embodiments, the skiving device 208 is knife, scooping device, or other device configured to remove sections of a tire carcass. The skiving device 208 may be coupled to a robotic arm or similar positioning device. The skiving device 208 is controlled by the computer system 102. The computer system 102 sends signals to the skiving device 208 with instructions that cause the skiving device 208 to remove areas of the damaged tire carcass 202. In some embodiments, the data received from the scanner 206 is used to determine which areas of the tire carcass 202 should be repaired. In some embodiments, the depth of the skived area is determined responsive to the size of the anomaly. In some embodiments, the depth of the skived area is predetermined for each anomaly.

While the skiving device 208 is operating, the vacuum 210 is configured to create a vacuum (e.g., an area of suction corresponding to negative pressure) for the areas around the skiving device 208. Using the vacuum 210 reduces the likelihood of contamination of the surface of the damaged tire carcass 202 due to the operation of the skiving device 208. In some embodiments, the position of the vacuum 210 is repositioned during operation.

After an anomaly has been skived by the skiving device 208, the skived area is filled with a filling material, wherein the filling material is suitable for tire carcass repair (e.g., uncured rubber, synthetic rubber, natural rubber, precured rubber, extruder rope, etc.) by the filling device 212. In some embodiments, the filling device 212 is a rubber-extruding gun or similar device configured to fill skived out areas. In some embodiments, the filling device 212 is operably coupled to a robotic arm or similar positioning device configured to position an attachment at a particular point circumferentially about the damaged tire carcass 202 to fill skived areas on the damaged tire carcass 202. The filling device 212 is controlled by the computer system 102. The computer system 102 sends instructions to the filling device 212 that include a location of a skived area, a depth of a skived area, and other information relating to filling the skived areas.

In some embodiments, the filling device 212 may fill a first skived area while the skiving device 208 is skiving a second skived area (e.g., a second artifact that is to be skived). The vacuum 210 is configured to vacuum the portions of the tire carcass 202 removed by the skiving device 208 such that the filling device 212 may operate simultaneously with the skiving device 208 without contaminating the un-vulcanized rubber product provided by the filling device 212. The computer system 102 may use the data sent by the scanner 206 to determine locations on the damaged tire carcass 202 that should be filled. In some embodiments, the filling device 212 dispenses a predetermined amount of material on each skived area, wherein the predetermined amount is the same for each skived area. The predetermined amount may be a predetermined weight (e.g., 10 g, 20 g, 30 g, etc.) and/or a predetermined volume (e.g., 10 mL, 20 mL, 30 mL, 40 mL, 50 mL, etc.). In some embodiments, the filling device 212 dispenses an amount of material corresponding to characteristics (e.g., depth, width, etc.) of the skived area.

For example, the scanner 206 is configured to detect one or more of a depth, axial width, and a circumferential height of each skived area provided on the damaged tire carcass 202. Using one or more of the depth, axial width, and circumferential height of each skived area, the computer system 102 may determine (e.g., approximate) a volume of the skived area and may send instructions to the filling device 212 to provide a similar volume of filling material. In some embodiments, the computer system 102 provides instructions to the filling device 212 to provide a volume of filling material equal to an amount greater than the approximated volume of the skive (e.g., more than about 100%, more than about 110%, more than about 120% or more than about 125% of the approximated volume, or between about 100% to about 125%). In some embodiments, the filling device 212 over-fills (e.g., include more material) the skived area to ensure the skived area is sufficiently filled. In some embodiments, the computer system 102 may provide instructions to the filling device 212 to provide a volume of filling material equal to 80% of the approximated volume of the skive. After each skived area is filled, the damaged tire carcass 202 becomes a repaired tire carcass 214.

Figure 3:
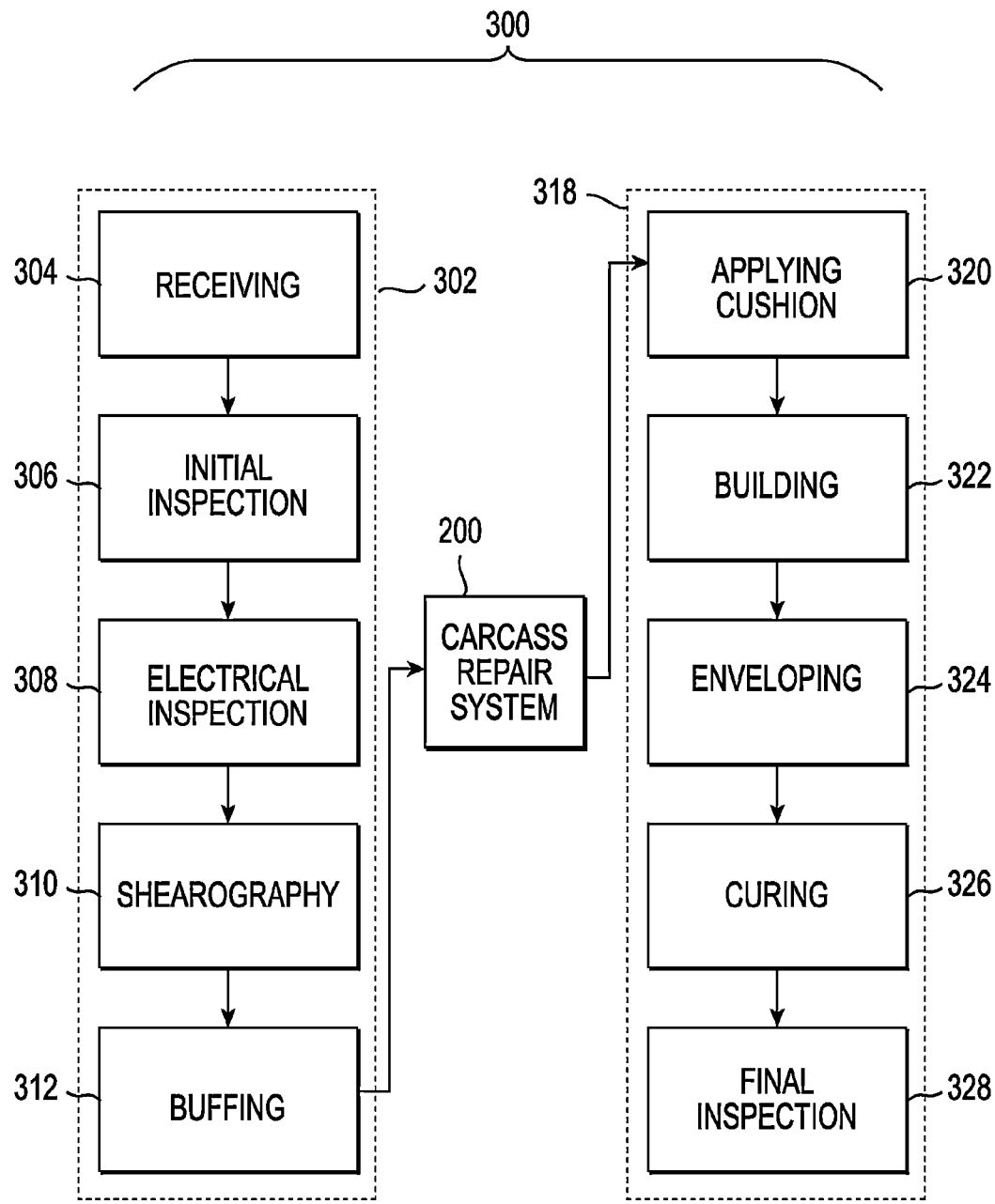
FIG. 3 is a process diagram of a method of retreading a tire, according to an example embodiment.

Referring now to FIG. 3, a process diagram of a tire retreading method 300 is shown, according to an example embodiment. The tire retreading method 300 begins with initialization process 302. At the initialization process 302, a tire is inspected and prepared for repair and retreading. At 304, a used tire is received by a retreading facility. The used tire may be a damaged tire or a tire that has been used on a vehicle. The used tire is then inspected at 306. This initial inspection may be performed manually by an operator. After the initial inspection, the used tire undergoes an electrical (e.g., non-destructive) inspection at 308. The electrical inspection uses high voltage to identify anomalies in the used tire. In some embodiments, the locations of the anomalies identified by the electrical inspection may be stored on a computer memory and may be accessed later. The used tire undergoes an additional inspection at 310. At 310, shearographic inspection (e.g., speckle pattern shearing interferometry) is used to determine if there are any nonconforming areas in the used tire. In some embodiments, a method including performing inspection both with shearographic techniques and an electrical voltage application improves the accuracy of a determination of whether one or more nonconforming areas exist in the sidewalls and/or the treaded portion of the tire.

In some embodiments, the locations of the anomalies identified during shearography are stored on a computer memory and may be accessed later. After the used tire is inspected, the surface is buffed at 312. During buffing, the tire tread is removed from the tire such that only a bare tire carcass, such as the damaged tire carcass 202, remains. Buffing prepares the tire carcass for repair at the carcass repair system 200. The carcass repair system 200 may utilized the same repair process for every type of tire or may be adjusted specifically for the type (e.g., size, material, etc.) of tire being repaired.

After the tire carcass is repaired at 200, the tire carcass is retreaded during the tire retread process 318. At 320, a gum cushion (e.g., material used to adhere a tread to the tire carcass) is applied to the tire carcass. In some embodiments, the gum cushion is sufficiently thick to fill any portions of the tire carcass that may have been under-filled by the carcass repair system 200. Once the gum cushion is applied, the tire carcass is built up at 322 by applying a tire tread over the cushion gum to become an uncured tire. At 324, the uncured tire is enveloped to seal the tire tread to the tire carcass. The uncured tire is then cured at 326. After the tire is cured, it is finally inspected at 328. Once it has passed inspection, the tire is determined to be suitable for operation/use. Thus, the carcass repair system 200 is conducive to resolving issues that impact whether a tire passes inspection.

Figure 4:
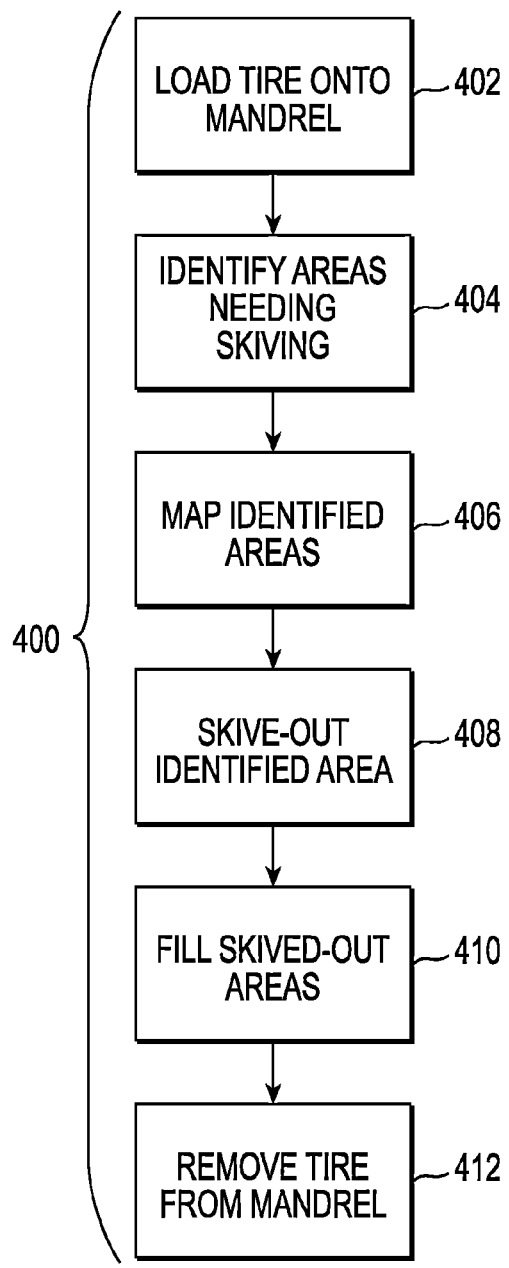
FIG. 4 is a process diagram of a sequential method of the tire carcass repair process of FIG. 2.

Referring now to FIG. 4, in some embodiments, the method 400 may be carried out in a sequential manner. The sequential method 400 may be carried out by the computer system 102, such that each step is completed automatically and such that a plurality of steps may be performed without user input. For example, each step may be completed by a robotic device associated with components that receives instructions from the computer system 102. In some embodiments, a user enters instructions for one or more steps into the computer system 102. In some embodiments, the computer system 102 may be partially automated such that a user provides initial inputs and then one or more steps of method 400 may be carried out in an automated manner without further user involvement.

At 402, a tire carcass, such as the tire carcass 202, is loaded onto a mandrel, such as the mandrel 204. The tire carcass may be loaded onto the mandrel by a robotic arm or by a user. The mandrel is then coupled to the tire carcass. At 404, areas for repair are identified by the scanner 206 (e.g., by determining a different surface characteristic from a surrounding area). In some embodiments, identification in the areas that should be repaired is accomplished prior to 402, and the computer system 102 reads in the prior identified data at 404. At 406, the computer system 102 maps the identified areas. The mapped areas are then stored in the memory 106 of the computer system 102. Mapping includes creating a 3-dimensional model of the tire carcass and the corresponding areas that are identified. Mapping allows for the computer system 102 to instruct the skiving device 208 and the filling device 212 to skive and fill the identified areas.

At 408, the computer system 102 sends instructions to the skiving device 208 to skive the mapped areas. The computer system 102 generates a skiving path (e.g., a tool path) based on one or more of the locations of the identified areas. In some embodiments, the skiving path is determined as the shortest route for the skiving device 208 to skive all the identified areas.

At 410, the computer system 102 instructs the filling device 212 to fill in the skived areas. In some embodiments, the same robotic arm operates the skiving device 208 and the filling device 212. For example, the robotic arm may be controlled to couple to the skiving device 208, skive the mapped areas, and then decouple from the skiving device 208. After the skiving device 208 is decoupled, the robotic arm may be controlled to couple to the filling device 212. The filling device 212 may sequentially follow the skiving path as determined by the computer system 102. In some embodiments, the computer system 102 develops a filling path based on the areas that were skived. The filling path may also include information corresponding to a quantity of material to be deposited by the filling device 212 in each area. In some embodiments, the filling path may be tailored for efficiency, so that the filling path is completed in the shortest amount of time possible. For example, the filling path may direct the robot arm to position the filling device such that it sequentially fills each skived area circumferentially around the tire carcass, thereby reducing the distance between each filling process. After each skived area is filled, the tire carcass is removed from the mandrel 204 at 412 and continues to retreading.

Figure 5:
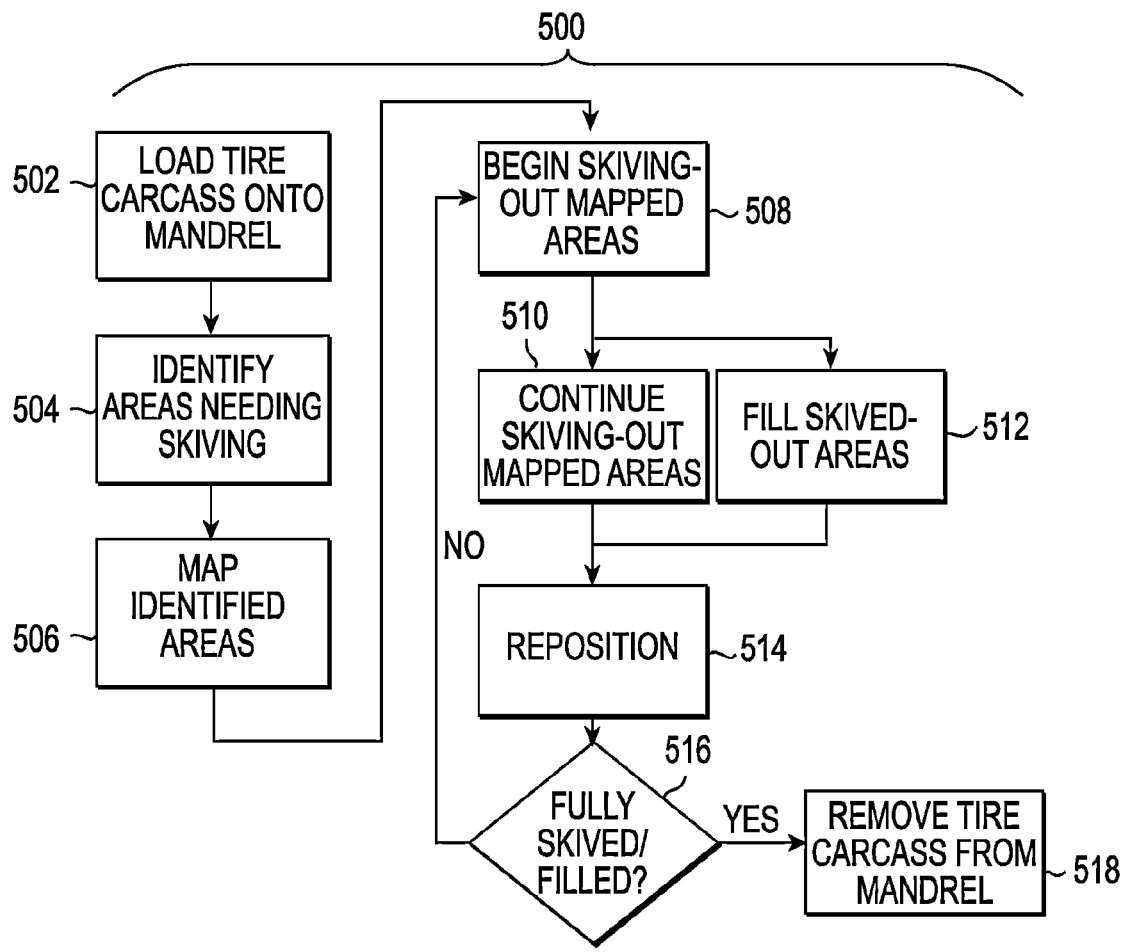
FIG. 5 is a process diagram of a method of the tire carcass repair process of FIG. 2.

Referring to FIG. 5, a process diagram of a method 500 utilizing the carcass repair system 200 is shown. The method 500 employs simultaneous skiving and filling of a tire carcass, such as the tire carcass 202, to increase the efficiency of the carcass repair system 200 as compared to the sequential method 400. In some embodiments, the simultaneous method 500 is preferred over the sequential method 400, as the simultaneous method 500 may be more efficient than the sequential method 400, which may reduce time needed for the tire retread process 318. The simultaneous method 500 may be controlled by the computer system 102 such that each step is completed automatically without user input. For example, each step may be completed by a robotic device associated with components that receives instructions from the computer system 102. In some embodiments, a user enters instructions for each step into the computer system 102. In some embodiments, the computer system 102 may switch between the sequential method 400 and the simultaneous method 500 depending on particular circumstances (e.g., size of the tire carcass, severity of damage to the carcass, etc.). A user may also input signals into the computer system 102 to select or switch between the methods depending on preference or configuration, for example.

At 502, a tire carcass is loaded onto a mandrel, such as the mandrel 204. The tire carcass may be loaded by a robotic arm or by a user. The mandrel 204 is then coupled to the tire carcass. At 504, areas that should be repaired are identified by the scanner 206. In some embodiments, identification is performed prior to this step, and the computer system 102 reads in the prior identified data at 504. At 506, the identified areas are mapped. Mapping is completed by the computer system 102 and the mapped areas are then stored in the memory 106 of the computer system 102. Mapping includes creating a 3-dimensional model of the tire carcass and the corresponding areas that are identified. Mapping allows for the computer system 102 to instruct the skiving device 208 and the filling device 212 to skive and fill the correct areas.

At 508, the computer system 102 sends instructions to the skiving device 208 to skive the mapped areas. The computer system 102 generates a skiving path based on the locations of the identified areas. In some embodiments, the skiving path is determined as the shortest route for the skiving device 208 to skive all the identified areas. At 510, the skiving path continues to be followed by the computer system 102 and the skiving device 208. Simultaneously, the computer system 102 sends instructions to the filling device 212 to fill in the areas skived by the skiving device 208. The computer system 102 generates a filling path, which may be determined as the shortest route (shortest path) for the filling device 212 to fill in all the skived areas. In some embodiments, the filling path is the same as the skiving path, but with a delay to prevent the skiving device 208 and the filling device 212 from interfering during operation. Thus, the delay acts as an offset between operations of the skiving device 208 and filling device 212. The delay may be a step delay (e.g., filling device 212 fills an area right after it has been skived). The step delay prevents the filling device 212 from interfering with the operation of the skiving device 208. In other words, the delay is such that there is no overlap between the filling and the skiving from the respective filling device 212 and skiving device 208. In some embodiments, the delay is a time delay, where the filling device 212 waits a predetermined amount of time (e.g., 1 second, 2 seconds, 3 seconds, 4 seconds, 5 seconds, etc.). Waiting a predetermined amount of time may allow the skived areas to cool off prior to filling.

At 514, the relative position of the tire carcass and the skiving device 208 and the filling device 212 is repositioned. In some embodiments, repositioning includes the tire carcass rotating on the mandrel 204. In some embodiments, repositioning includes altering the positions of the skiving device 208 and the filling device 212. For example, if the skiving device 208 and the filling device 212 are coupled to robotic arms, the position of the robotic arm may be repositioned. The computer system 102 controls the repositioning by sending instructions to components of the tire repair system 100 associated with repositioning. In some embodiments, repositioning occurs automatically during steps 510 and 512. At 516, the computer system 102 determines if all mapped areas of the tire carcass are skived and subsequently filled. In some embodiments, this determination is responsive to whether or not the skiving path and the filling path are complete. In some embodiments, the tire carcass is additionally scanned to determine if the tire carcass is fully repaired. If at 516, the tire carcass is determined to be repaired, the tire carcass is removed from the mandrel 204 at 518.

Figure 6:
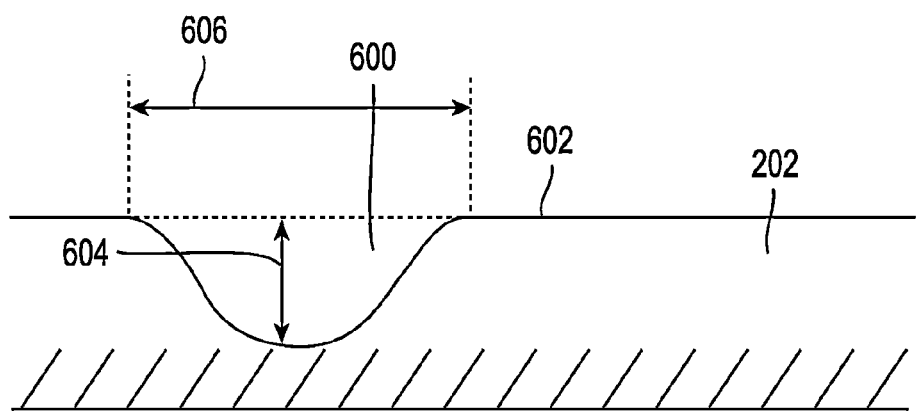
FIG. 6 is a sectional view of a tire carcass, according to an example embodiment.

Referring to FIG. 6, a sectional view of a tire carcass, such as damaged tire carcass 202, is shown. The damaged tire carcass 202 has been skived and includes a skived area 600, which is a depression in the tire carcass surface 602. The skived area 600 has a skive depth 604 relative to the tire carcass surface 602. The skived area 600 also has a skive width 606 corresponding to the largest distance between two points of the skived area 600 that lie within the same plane as the tire carcass surface 602. In some embodiments, the skive depth 604 and the skive width 606 vary depending on the skiving device 208, the size of the anomaly that was skived, and other similar factors. In some embodiments, a full damaged tire carcass 202 includes a plurality of skived areas 600 after skiving.

Figure 7:
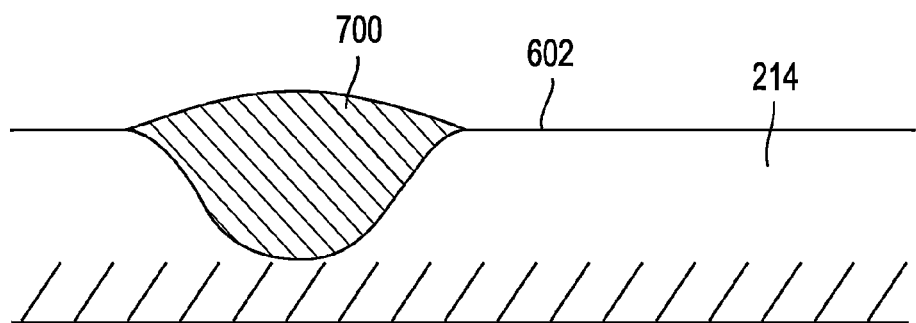
FIG. 7 is a section view of the tire carcass of FIG. 6 after filling.

Referring to FIG. 7, a sectional view of the tire carcass of FIG. 6 is shown after the skived area 600 has been filled. Filling includes filling the skived area 600 of the damaged tire carcass 202 with an amount of material to form a filled area 700. The skived area 600 is filled by a filling device 212, as instructed by the computer system 102. The amount of material deposited by the filling device 212 may be responsive to the shape and size of the skived area (e.g., responsive to the skive depth 604 and the skive width 606). For example, the computer system 102 may determine the volume of material needed to fill the skived area 600 and then send instructions to the filling device 212 to deposit the volume of material needed. In some embodiments, the computer system 102 sends the filling device 212 instructions to deposit an equal amount of material in each skived area 600.

In some embodiments, the filling of the filled area 700 is flush with the tire carcass surface 602. In some embodiments, the filled area 700 is over-filled (e.g., extending above the tire carcass surface 602). Over-filling may ensure that the skived area 600 is completely filled. However, in some embodiments, the filled area 700 may be under-filled (e.g., below the tire carcass surface 602).

Figure 8:
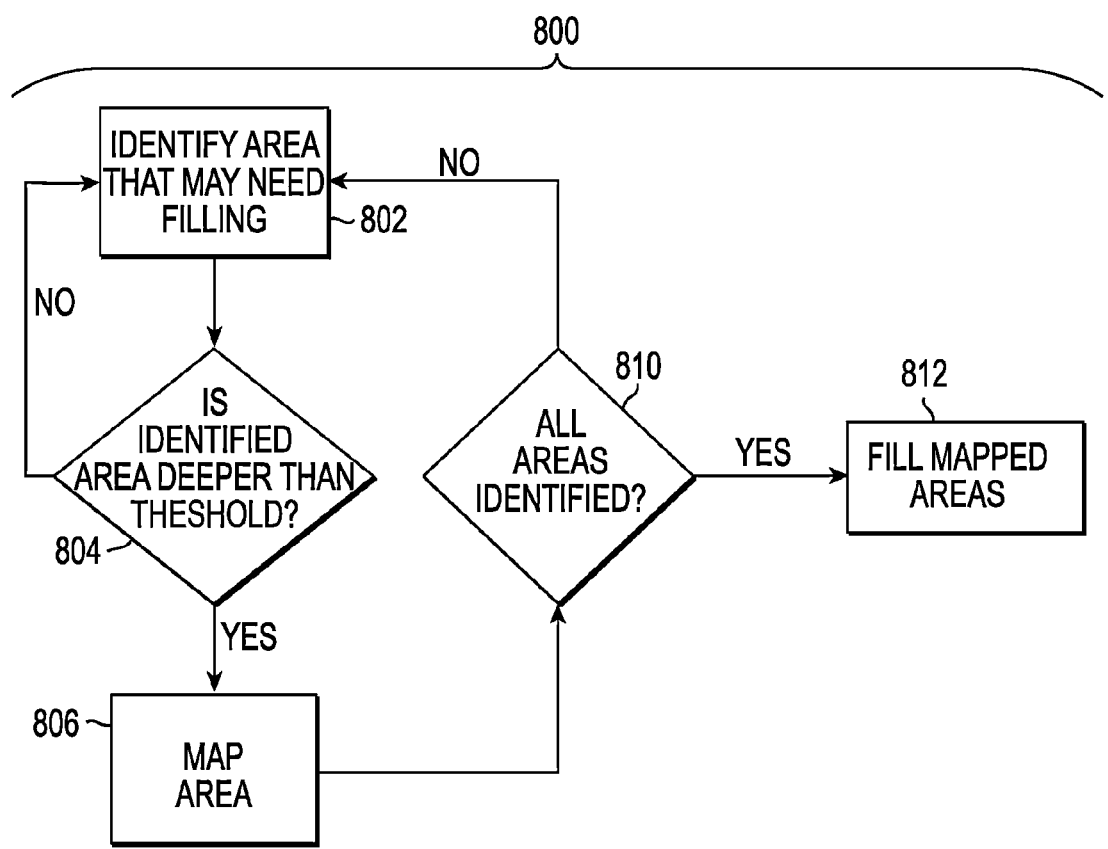
FIG. 8 is a process diagram of a filling determination method, according to an example embodiment.

Referring to FIG. 8, a process diagram of a filling determination method 800 is shown. In some embodiments, not all of the skived areas 600 of a damaged tire carcass 202 are filled. For example, shallow (e.g., having a shallow skive depth 604) areas may be filled by the cushion gum downstream from the carcass repair system 200. The filling determination method 800 is controlled by the computer system 102. The filling determination method 800 determines which areas of a damaged tire carcass 202 should be filled. Determining which areas should be filled may improve the efficiency of the carcass repair process. For example, not performing filling on shallow areas that can be filled by the cushion gum may reduce overall repair time.

At 802, an area that should be filled is identified. The area may be an area that is mapped for skiving, or the area may be have been determined by the scanner 206. Once the area has been identified, the computer system 102 determines if depth of the identified area (e.g., the skive depth 604) is deeper than a predetermined threshold. The predetermined threshold may be the maximum depth that the cushion gum can fill during the retreading process. If the identified area is not deeper than the predetermined threshold, then the filling determination method 800 returns to 802 and another area is identified. Once an identified area is determined to be deeper than a predetermined threshold at 804, the area is mapped at 806 by the computer system 102. While mapping the areas at 806, the computer system 102 may generate one or more filling paths.

At 810, the computer system 102 determines whether each of the areas identified previously at 802 have been mapped. If not, additional areas as identified at 802 are mapped. If all areas are identified, the filling determination method 800 continues to 812. At 812, all the mapped areas are filled following the filling path.

Referring generally to FIGS. 9-14, example embodiments of a tire repair system 100 and of components of the tire repair system 100 are shown. In some embodiments, the tire repair system 100 is reconfigured for different types of tires. In some embodiments, the components of the tire repair system 100 are replaced with similar components. In some embodiments, the components of the tire repair system 100 are used for additional processes outside of the scope of the tire repair process. FIGS. 9, 11, 12, and 13 show a robotic arm 900. In some embodiments, this robotic arm 900 is used for several different processes or may be specialized to one process. In some embodiments, the tire repair system 100 includes more than one robotic arm 900. In some embodiments, the robotic arm is an industrial robot that is configured to assume various positions. For example, the head of the industrial robot may be selectively positioned within an x, y, z coordinate space by one or more servomechanisms.

Figure 9:
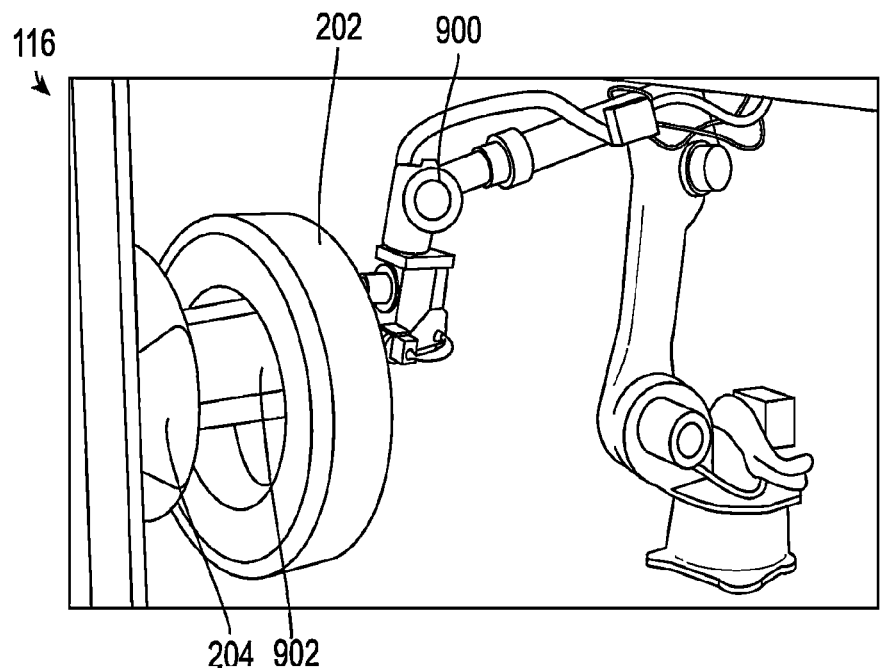
FIG. 9 is a depiction of a robotic arm positioning a tire carcass onto a mandrel, according to an example embodiment.

Referring to FIG. 9, repair componentry 116 is shown, according to an example embodiment. The robotic arm 900 is configured to position a damaged tire carcass 202 on a mandrel 204. Once the damaged tire carcass 202 is positioned on the mandrel 204, the mandrel arms 902 expand to couple the damaged tire carcass 202 to the mandrel 204. This process may be reversed when removing a tire carcass from the mandrel 204.

Figure 10:
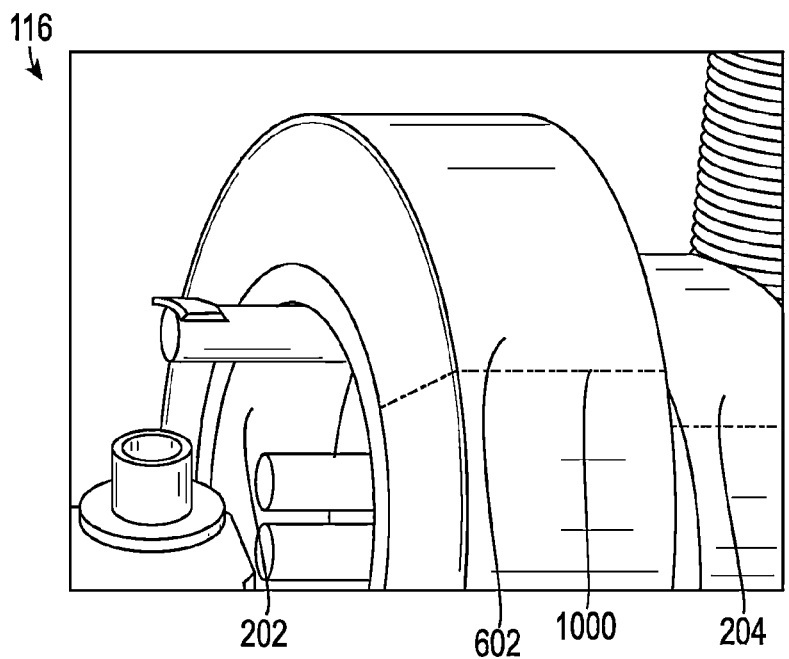
FIG. 10 is a depiction of a scanning device, according to an example embodiment.

Referring to FIG. 10, repair componentry 116 is shown, according to an example embodiment. FIG. 10 depicts a scanning operation. The scanning may be carried out by an optical scanner (e.g., scanner 206 shown in FIG. 2) that employs a laser 1000 to scan the tire carcass surface 602 of the damaged tire carcass 202. In some embodiments, the scanner 206 is in a fixed position relative to the mandrel while the mandrel 204 rotates the damaged tire carcass 202 such that the scanner 206 scans the entirety of the damaged tire carcass 202. The computer system 102 analyzes the data produced by the scanner 206 to determine which areas of the damaged tire carcass 202 should be repaired.

Figure 11:
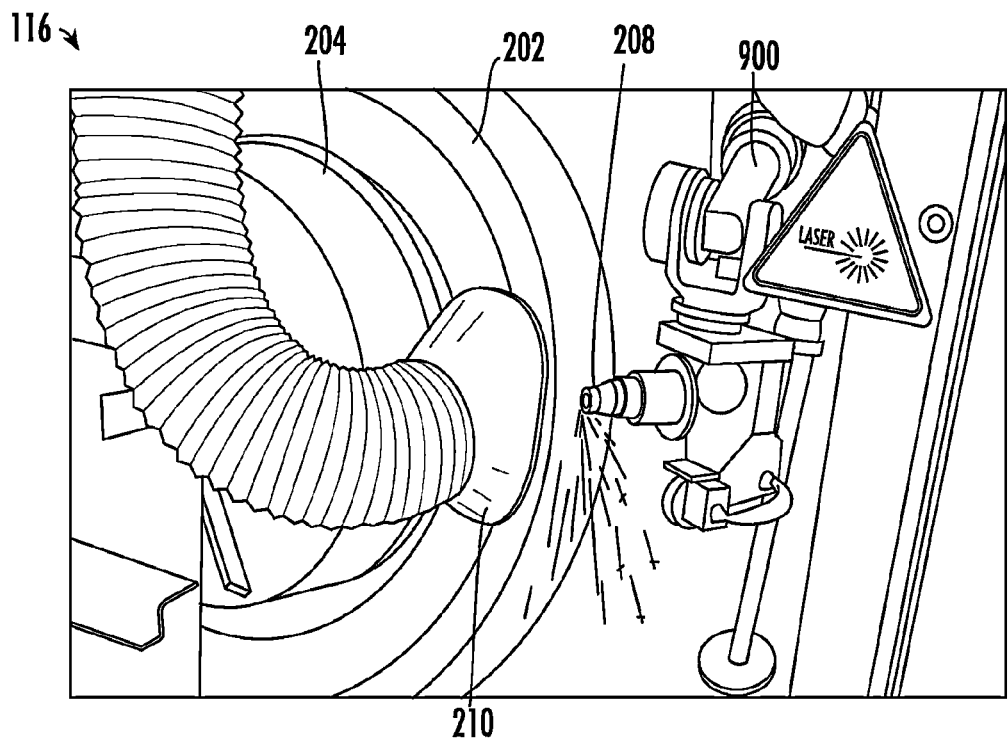
FIG. 11 is a depiction of a skiving device, according to an example embodiment.

Referring now to FIG. 11, a depiction of the skiving device 208 coupled to the robotic arm 900 is shown skiving the damaged tire carcass 202 coupled to the mandrel 204. A vacuum 210 removes (e.g., by applying negative pressure) any contaminants produced by skiving the tire carcass 202. The mandrel 204 may rotate the damaged tire carcass 202 such that the skiving device 208 may skive anywhere on the surface of the damaged tire carcass 202 without having to move circumferentially about the tire carcass 202. In some embodiments, the robotic arm 900 repositions the skiving device 208 circumferentially about the damaged tire carcass 202 while the tire carcass is rotated by the mandrel. In some embodiments, the mandrel 204 and the robotic arm 900 operate in tandem (e.g., simultaneously) to position the damaged tire carcass 202 and the skiving device 208. In some embodiments, the skiving device 208 of FIG. 11 is replaced by a filling device, such as the filling device 212.

Figure 12:
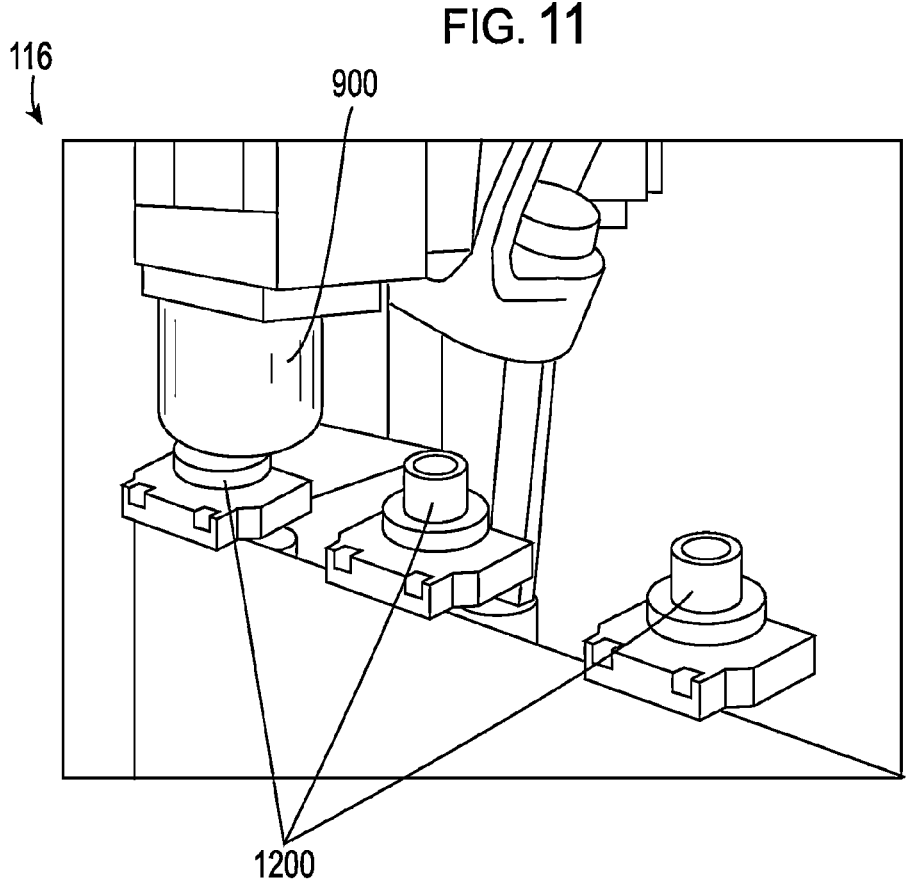
FIG. 12 is a depiction of a tool selection, according to an example embodiment.

Referring now to FIG. 12, a depiction of a tool selection is shown. The computer system 102 is configured to send instructions to the robot arm 900 to selectively couple to a tool from a variety of tools 1200 positioned within the x, y, z-coordinate space of the robot arm 900. The variety of tools 1200 may include the filling device 212 and the skiving device 208. The ability to selectively couple allows for a single robotic arm 900 to operate a variety of tools that may be used for different operations during the skiving and/or filling process. For example, the robotic arm 900 may first be operated by the computer system 102 to couple to the skiving device 208, skive areas of the damaged tire carcass 202, decouple from the skiving device 208, couple to a filling device 212, and then fill the skived areas 600. It should be appreciated that other intermediate or finishing operations may be performed according to various embodiments.

Figure 13:
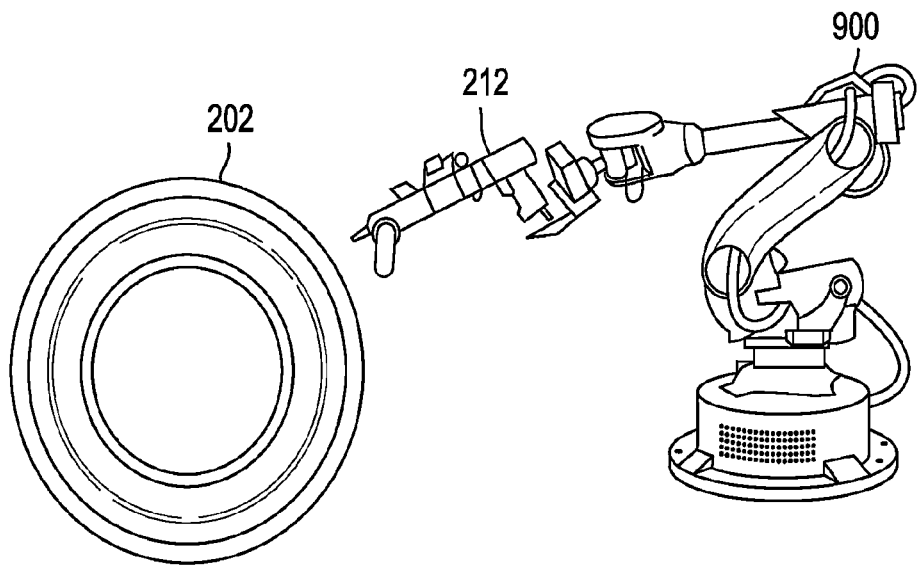
FIG. 13 is a side view of a filling device, according to an example embodiment.

Turning now to FIG. 13, a side view of a filling device 212 is shown, according to an example embodiment. The filling device 212 is operably coupled to a robotic arm 900. The robotic arm 900 is configured to position the filling device 212 relative to the damaged tire carcass 202 such that the filling device 212 is capable of providing an uncured rubber material to the tire carcass surface 602 of the damaged tire carcass 202.

Figure 14:
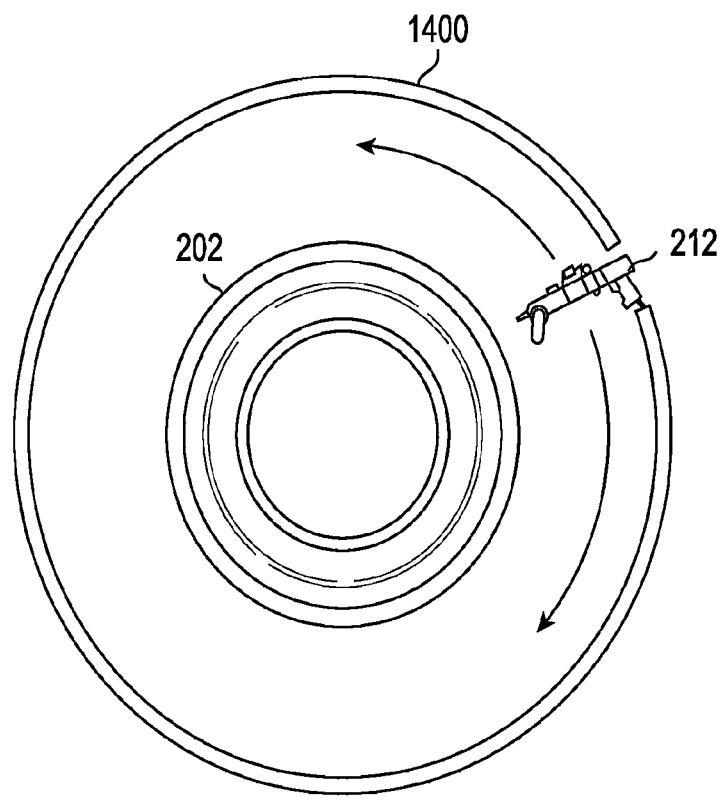
FIG. 14 is a side view of a filling device, according to another example embodiment.

Referring now to FIG. 14, a side view of a filling device 212 is shown, according to another example embodiment. The filling device 212 is coupled to (e.g., operably coupled to, slidably coupled to, etc.) a positioning rail 1400. The positioning rail 1400 is configured to position the filling device 212 circumferentially about the tire carcass. In some embodiments, the filling device 212 is slidably coupled to the positioning rail 1400 and is configured to translate circumferentially about the damaged tire carcass 202, such as by a linear bearing. The positioning rail 1400 is further structured to allow the filling device 212 to translate axially relative to the surface of the damaged tire carcass 202.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of system as shown in the various exemplary embodiments is illustrative only. Additionally, any element disclosed in one embodiment may be incorporated or utilized with any other embodiment disclosed herein. For example, the positioning rail of the exemplary embodiment described in reference to FIG. 14 may be incorporated in the method of the exemplary embodiment described in reference to at least FIG. 5. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for automatically filling skived areas on a tire carcass, the method comprising:
    analyzing, by a computer system, a surface of the tire carcass with a sensor;
    identifying, by the computer system, a first skived area of the tire carcass;
    determining, by the computer system, whether to perform a filling operation to fill the first skived area;
    communicating, by the computer system, a location of the first skived area to a filling device responsive to a determination to perform the filling operation;
    translating the filling device to a position proximate the location of the first skived area, the filling device coupled with a circumferential rail extending circumferentially around the tire carcass such that the filling device circumferentially translates along the surface of the tire carcass; and
    filling, by the filling device, the first skived area.

2. The method of claim 1, wherein determining whether to perform the filling operation to fill the first skived area comprises:
    determining, by the computer system, a first depth of the first skived area; and
    determining, by the computer system, that the first depth of the first skived area is greater than a predetermined depth threshold.

3. The method of claim 2, further comprising:
    determining, by the computer system, a second depth of a second skived area;
    determining, by the computer system, that the second depth of the second skived area is greater than the predetermined depth threshold; and
    filling, by the filling device, the second skived area responsive to determining that the second depth of the second skived area is greater than the predetermined depth threshold.

4. The method of claim 1, further comprising:
    identifying, by the computer system, a plurality of skived areas of the tire carcass;
    mapping, by the computer system, the plurality of skived areas to create a coordinate map of the plurality of skived areas;
    generating, by the computer system, a filling path based on the coordinate map;
    sending, by the computer system, the filling path to the filling device; and
    automatically filling the plurality of skived areas with the filling device, the filling device following the filling path by translating along the circumferential rail.

5. The method of claim 4, wherein the filling path includes a shortest tool path for the filling device to fill in the plurality of skived areas.

6. The method of claim 4, wherein the filling path is generated such that operation of the filling device is offset from operation of a skiving device.

7. A system for automatically filling skived areas on a tire carcass, the system comprising:
    a scanner;
    a filling device;
    a circumferential rail that extends circumferentially around the tire carcass, the filling device configured to couple with and translate along the circumferential rail such that the filling device circumferentially translates along a surface of the tire carcass; and
    a controller communicatively coupled to the scanner and the filling device, the controller comprising a processor and a memory configured to store instructions to cause the controller to perform operations comprising:
        analyze, using the scanner, the surface of the tire carcass;
        identify a first skived area of the tire carcass;
        determine whether to perform filling of the first skived area; and
        provide an instruction to the filling device to fill the first skived area.

8. The system of claim 7, wherein the filling device is operably coupled to an industrial robot having a robotic arm configured to position the filling device circumferentially about the surface of the tire carcass when the tire carcass is operably coupled to the system.

9. The system of claim 7, further comprising a mandrel configured to couple to the tire carcass and configured to rotate the tire carcass in response to receiving a rotational signal from the controller.

10. The system of claim 7, wherein the instructions further cause the controller to:
    cause the filling device to be positioned in confronting relation to the tire carcass; and
    translate the filling device circumferentially and axially about the tire carcass.

11. The system of claim 7, wherein the instructions further cause the controller to:
    determine a first depth of the first skived area;
    determine whether the first depth of the first skived area is greater than a predetermined depth threshold; and
    provide an instruction to the filling device to fill the first skived area responsive to determining that the first depth of the first skived area is greater than the predetermined depth threshold.

12. The system of claim 11, wherein the instructions further cause the controller to:
    determine a second depth of a second skived area;
    determine whether the second depth of the second skived area is greater than the predetermined depth threshold; and
    provide an instruction to the filling device to fill the second skived area responsive to determining that the second depth of the second skived area is greater than the predetermined depth threshold.

13. The system of claim 7, wherein the instructions further cause the controller to:

generating a filling path for filling the first skived area;
sending the filling path to the filling device; and
providing an instruction to the filling device to perform a filling operation to fill the first skived area by the filling device by following the filling path.

14. The system of claim 13, wherein the filling path corresponds to a shortest tool path the filling device travels during filling.

15. The system of claim 13, wherein the instructions are configured to determine a timing of the filling operation based at least in part on a timing of a skiving operation by a skiving device such that the filling operation is offset from the skiving operation.

* * * * *